United States Patent
Palazzolo

(10) Patent No.: US 11,377,122 B2
(45) Date of Patent: Jul. 5, 2022

(54) SYSTEM AND METHOD FOR AUTONOMOUSLY GUIDING A VEHICLE INTO AN OIL CHANGE BAY OR A CONVEYOR OF AN AUTOMATED CAR WASH

(71) Applicant: Continental Automotive Systems, Inc., Auburn Hills, MI (US)

(72) Inventor: Jill Anne Palazzolo, Rochester, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 259 days.

(21) Appl. No.: 16/725,453

(22) Filed: Dec. 23, 2019

(65) Prior Publication Data

US 2021/0188321 A1 Jun. 24, 2021

(51) Int. Cl.
*B60W 60/00* (2020.01)
*G05D 1/00* (2006.01)
(Continued)

(52) U.S. Cl.
CPC ........ *B60W 60/0025* (2020.02); *B60W 10/18* (2013.01); *B60W 10/20* (2013.01); *G05D 1/0016* (2013.01); *G05D 1/0246* (2013.01); *G06T 7/73* (2017.01); *G06V 20/56* (2022.01); *B60S 3/004* (2013.01); *B60S 5/00* (2013.01);
(Continued)

(58) Field of Classification Search
CPC .. B60W 60/0025; B60W 10/18; B60W 10/20; B60W 2540/215; B60W 2540/21; B60W 2420/42; G06T 7/73; G06T 2207/30204; G06T 2207/30252;
(Continued)

(56) References Cited

U.S. PATENT DOCUMENTS

2013/0078063 A1* 3/2013 Shani ...................... E04H 6/424
414/253
2014/0048104 A1* 2/2014 Stadler ..................... G08G 1/04
134/18
(Continued)

FOREIGN PATENT DOCUMENTS

DE 102018222649 A1 * 6/2020 ............. B60L 53/66

OTHER PUBLICATIONS

Kleinemas et al.; English Translation of DE-102018222649-A1; 2020, Espacenet (EPO) (Year: 2020).*

*Primary Examiner* — Fadey S. Jabr
*Assistant Examiner* — Naeem Taslim Alam

(57) ABSTRACT

A system for autonomously moving and aligning a vehicle with respect to an object fixed to a traveling surface in front of the vehicle includes at least one camera packaged within the vehicle to obtain images of the fixed object. A controller packaged within the vehicle receives the images from the camera and processes the images so as to identify and locate the fixed object with respect to the vehicle. A drive system, connected with the controller, is constructed and arranged to cause autonomous movement, steering and braking of the vehicle. A user input device is constructed and arranged to activate the controller 1) to identify and locate the fixed object relative to the vehicle, and 2) to command the drive system to autonomously move the vehicle towards the fixed object and to stop the vehicle so as to be aligned relative to the fixed object.

18 Claims, 4 Drawing Sheets

(51) Int. Cl.
  *G05D 1/02* (2020.01)
  *B60W 10/20* (2006.01)
  *B60W 10/18* (2012.01)
  *G06T 7/73* (2017.01)
  *G06V 20/56* (2022.01)
  *B60S 3/00* (2006.01)
  *B60S 5/00* (2006.01)

(52) U.S. Cl.
  CPC ..... *B60W 2420/42* (2013.01); *B60W 2540/21* (2020.02); *B60W 2540/215* (2020.02); *G06T 2207/30204* (2013.01); *G06T 2207/30252* (2013.01)

(58) Field of Classification Search
  CPC ............... G05D 1/0016; G05D 1/0246; G06K 9/00791; B60S 3/004; B60S 5/00
  See application file for complete search history.

(56) References Cited

U.S. PATENT DOCUMENTS

| | | | | |
|---|---|---|---|---|
| 2016/0091899 A1* | 3/2016 | Aldred | ................... | B60L 53/14 901/1 |
| 2018/0056801 A1* | 3/2018 | Leary | ................... | B60L 53/305 |
| 2018/0334039 A1* | 11/2018 | Sham | ................... | B60L 53/10 |
| 2018/0339890 A1* | 11/2018 | Perlstein | ................... | B66F 3/46 |
| 2019/0167059 A1* | 6/2019 | Brown | ................... | A47L 9/2805 |
| 2019/0337404 A1* | 11/2019 | Matsuo | ................... | B60L 5/005 |
| 2021/0031370 A1* | 2/2021 | Spurgeon | ................ | G06Q 50/28 |
| 2021/0157933 A1* | 5/2021 | Turano | ................ | G06F 21/6245 |

* cited by examiner

SYSTEM AND METHOD FOR AUTONOMOUSLY GUIDING A VEHICLE INTO AN OIL CHANGE BAY OR A CONVEYOR OF AN AUTOMATED CAR WASH

FIELD

This disclosure relates to an automotive vehicle and, more particularly, to a system for autonomously guiding the vehicle into an oil change bay or into a conveying car wash.

BACKGROUND

Many vehicle drivers have problems aligning their vehicle when entering an automated car wash conveyor track, requiring a car wash attendant to manually guide the driver onto the track, since damage to the vehicle could result from vehicle misalignment. Furthermore, a similar problem exits in aligning a vehicle when entering a quick oil change bay since the vehicle must be guided over an opening or pit in the floor where the worker performs the oil change. Again, an attendant is typically needed for guiding the driver over the pit since serious damage to the vehicle can occur if a front or rear wheel of the vehicle accidently enters the pit.

Thus, there is a need to provide a system and method to autonomously move and align a vehicle into an oil change bay or into a conveying car wash without the driver operating the steering, acceleration, or braking of the vehicle and thus, without the need for an attendant.

SUMMARY

An objective of an embodiment is to fulfill the need referred to above. In accordance with the principles of an embodiment, this objective is obtained by providing a system for autonomously moving and aligning a vehicle with respect to an object fixed to a traveling surface in front of the vehicle. The system includes at least one camera packaged within the vehicle and constructed and arranged to obtain images of the fixed object, such as a car wash conveyor or track or an oil change bay pit. A controller, packaged within the vehicle, is constructed and arranged to receive the images from the camera and to process the images so as to identify and locate the fixed object with respect to the vehicle. A drive system, connected with the controller, is constructed and arranged to cause autonomous movement, steering and braking of the vehicle. A user input device is constructed and arranged to activate the controller 1) to identify and locate the fixed object relative to the vehicle, and 2) to command the drive system to autonomously move the vehicle towards the fixed object and to stop the vehicle so as to be aligned relative to the fixed object.

In accordance with another aspect of an embodiment, a method is provided for autonomously moving and aligning a vehicle with respect to an object fixed to a traveling surface in front of the vehicle. The method obtains images of the fixed object from at least one camera mounted on the vehicle. The images are received at a controller of the vehicle. The controller processes the images to identify and locate the fixed object with respect to the vehicle. The controller commands a drive system to cause autonomous movement, steering and braking of the vehicle so that the vehicle moves towards the fixed object and stops so as to be aligned relative to the fixed object.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
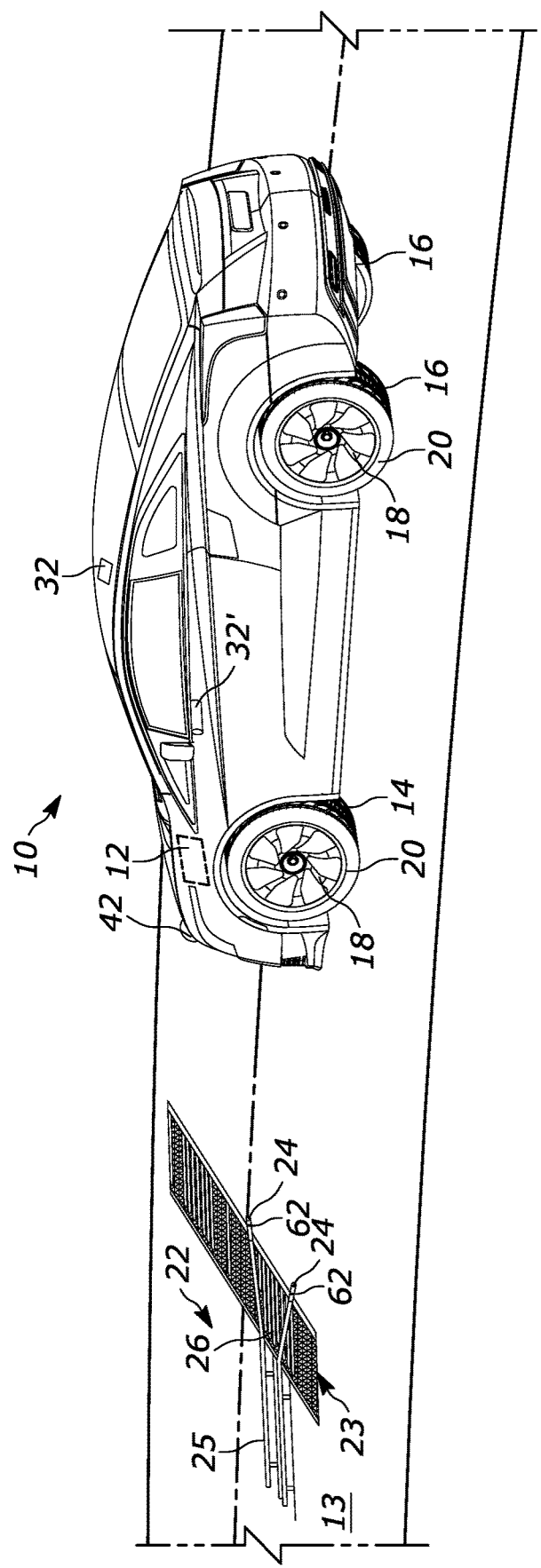
FIG. 1 is a perspective view of an exemplary vehicle having a system for guiding a vehicle into position relative to a fixed carwash conveyor track in accordance with an embodiment of the invention.

With reference to FIG. 1, a vehicle, generally indicated at 10, has system 12 for autonomously guiding a vehicle into a position relative to an object fixed to the travel surface 13 in front of the vehicle 10, in accordance with an embodiment of the invention. The vehicle 10 includes front tires 14 and rear tires 16. Each tire (14,16) includes a wheel portion 18 and an adjacent tire surface 20. The wheel portion 18 is defined to include the wheel, wheel rim, hub cap, or other decorative wheel covering.

In the embodiment of FIG. 1, the fixed object is a conveyor structure, generally indicated at 22, of an automated conveyor car wash system for directing and moving the vehicle 10 through the car wash. FIG. 1 shows a vehicle 10 approaching the conveyor structure 22 that includes a correlator section 23 that aids in correctly positioning at least the driver-side front tire 14 of the vehicle 10 within or on the track 25 of conveyor structure 22. Correlator guide rails 24 and support rails 26 rotate axially towards the center of the conveyor structure 22 to correctly align the driver-side front tire 14 of the vehicle 10.

Figure 2:
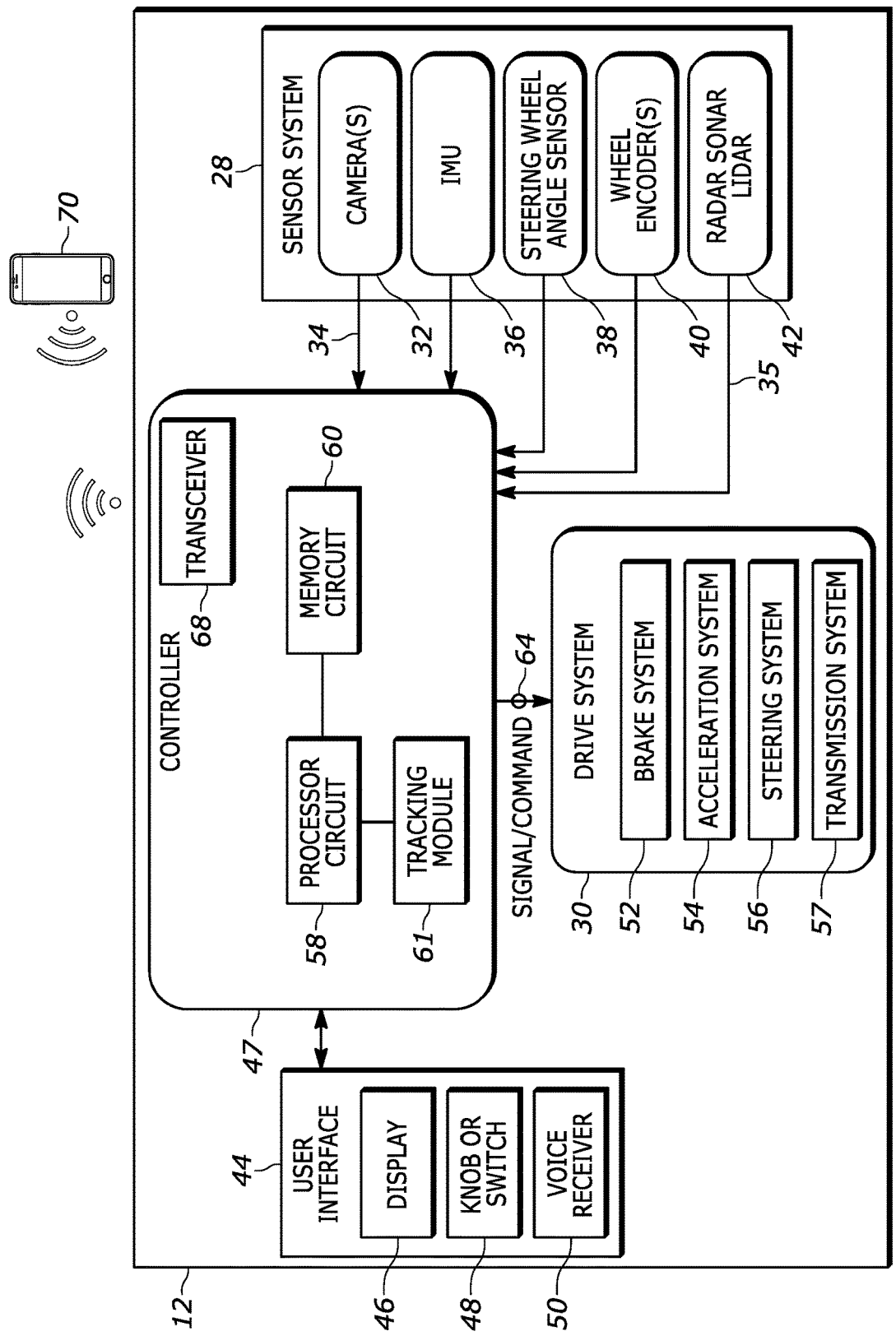
FIG. 2 is a schematic view of the system of FIG. 1.

In accordance with the embodiment, to avoid the requirement that a driver manually orient a tire 14 and drive the vehicle 10 into the conveyor structure 22, with reference to FIG. 2, the of the vehicle 10 is configured to operate autonomously.

Thus, the system 12 includes a sensor system 28 that includes different types of sensors that may be used separately or with one another to create a perception of the environment of the vehicle 10. The sensor system 28 aids the driver in making intelligent decisions based on objects and obstacles detected by the sensor system 28 and aids a drive system 30 in autonomously maneuvering the vehicle 10. The drive system 30 can be an autonomous sense, plan and act system. The sensor system 28 may include one or more cameras 32 supported by the vehicle to capture image signals 34 of the environment surrounding the vehicle 10. In an embodiment, at least one camera 32' (FIG. 1) is a front facing camera that is mounted near the front portion of the vehicle 10 to provide a view of the approaching driving path for the vehicle 10. In some examples, the front camera 32' is a monocular camera that produces a two-dimensional image. Other camera types may also be used.

The sensor system 28 also includes at least one of the following sensors: an Inertial Measurement unit (IMU) 36, steering wheel angle sensors 38, wheel encoders 40, and other sensors 42 such as, but not limited to, radar, sonar, LIDAR (Light Detection and Ranging, which can entail optical remote sensing that measures properties of scattered light to find range and/or other information of a distant target), LADAR (Laser Detection and Ranging) configured to determine a range, angle, or velocity of objects. The IMU 36 is configured to measure a linear acceleration of the vehicle 10 (using one or more accelerometers) and a rotational rate of the vehicle 10 (using one or more gyroscopes. In some examples, the IMU 36 also determines a heading reference of the vehicle 10. Therefore, the IMU 36 determines the pitch, roll, and yaw of the vehicle 10.

The system 12 includes a user interface 44 that receives one or more user commands from the driver via one or more input mechanisms such as a touch screen display 46, a knob or switch, or voice receiver 50 for activating an autonomous mode of the vehicle 10, as will be described more fully below. The user interface 44 is in communication with a vehicle controller 47, which is in turn in communication with a sensor system 28 and the drive system 30. In some examples, the user interface 44 displays an image of an environment of the vehicle 10 (for example, an overhead environment of the vehicle 10) leading to one or more commands being received by the user interface 44 (from the driver) that initiate execution of one or more behaviors.

The system 12 includes the drive system 30 that autonomously maneuvers the vehicle 10 across the travel surface 13 based on drive commands. The drive system 30 includes a brake system 52 that includes brakes associated with each wheel 18, an acceleration system 54 that is configured to adjust a speed of the vehicle 10, a steering system 56 that controls the steering and thus the direction of the vehicle 10, and a transmission system 57 for controlling which gear the vehicle 10 is operating in (e.g., park, drive, reverse, neutral).

The controller 47 includes a computing device such as a processor circuit 58 (e.g., central processing unit having one or more computing processors) in communication with a non-transitory memory circuit 60 (e.g., a hard disk, flash memory, random-access memory) capable of storing instructions executable by the processor circuit 58. The memory circuit 60 can store other vehicle data such as width of the tire 14, wheel track width, dimensions of conventional fixed objects, etc.

The controller 47 includes a tracking module 61 that receives an image signal 34 from at least one camera 32' and/or a signal 35 from the sensor 42. The tracking module 61 identifies the fixed object (e.g., conveyor structure 22) within the image signal 34 and/or signal 35 and tracks the conveyor structure 22 in subsequently received images signals 34 and/or signals 35. Therefore, the tracking module 61 calculates or determines a current location in the current image 34. The conveyor structure 22 location in the image is defined by (u, v), where u is the pixel position along an x-image axis of the image, and v is the pixel position along a y-image axis of the image. The tracking module 61 can use the processor circuit 58 or can have its own processing circuit and could also be used to determine distance from the vehicle 10 to the conveyor structure 22 and even map the conveyor structure 22 by use of the signal 35 from the radar, sonar or LIDAR sensor 42.

A driver, when approaching an automatic carwash, can activate an autonomous carwash mode of the vehicle 10 by using the user interface 44 such as the touch screen display 46, knob or switch 48, or a voice command received by the voice receiver 50. Then, the controller 47, with processor circuit 58 and tracking module 61 executing software stored in the memory circuit 60, is configured to receive sensed data, for example from at least one camera 32' and/or radar/sonar/LIDAR sensor 42 to identify and locate an object fixed on the travel surface 51 in front of the vehicle 10, and to control the steering, speed and braking of vehicle 10 based upon such sensed data. In the example embodiment of FIG. 1, the tracking module 61 identifies and locates the conveyor structure 22, as the fixed object, based upon the sensed data. The memory circuit 60 can also store standard dimensions of the opening of the correlator section 23 of the conveyor structure 22 to aid in guiding the vehicle tire 14 therein. For increased accuracy, portions of the conveyor structure 22 can include markers 62 thereon that are captured or sensed by the camera 32' and/or sensor 42. With at least the correlator section 23 of the conveyor structure 22 identified and located, the controller 47 sends the drive system 30 one or more commands 64 causing the steering system 56 and acceleration system 54 to autonomously maneuver the vehicle 10 in a forwards direction such that a tire 14 engages with the correlator section 23, and once engaged, the brake system 52 causes the vehicle 10 to stop, aligned with the correlator section 23 and thus the conveyor track 25. Thus, due to autonomously maneuvering the vehicle 10 into engagement with the conveyor structure 22, no attendant is needed and driver misalignment errors are eliminated.

Figure 3:
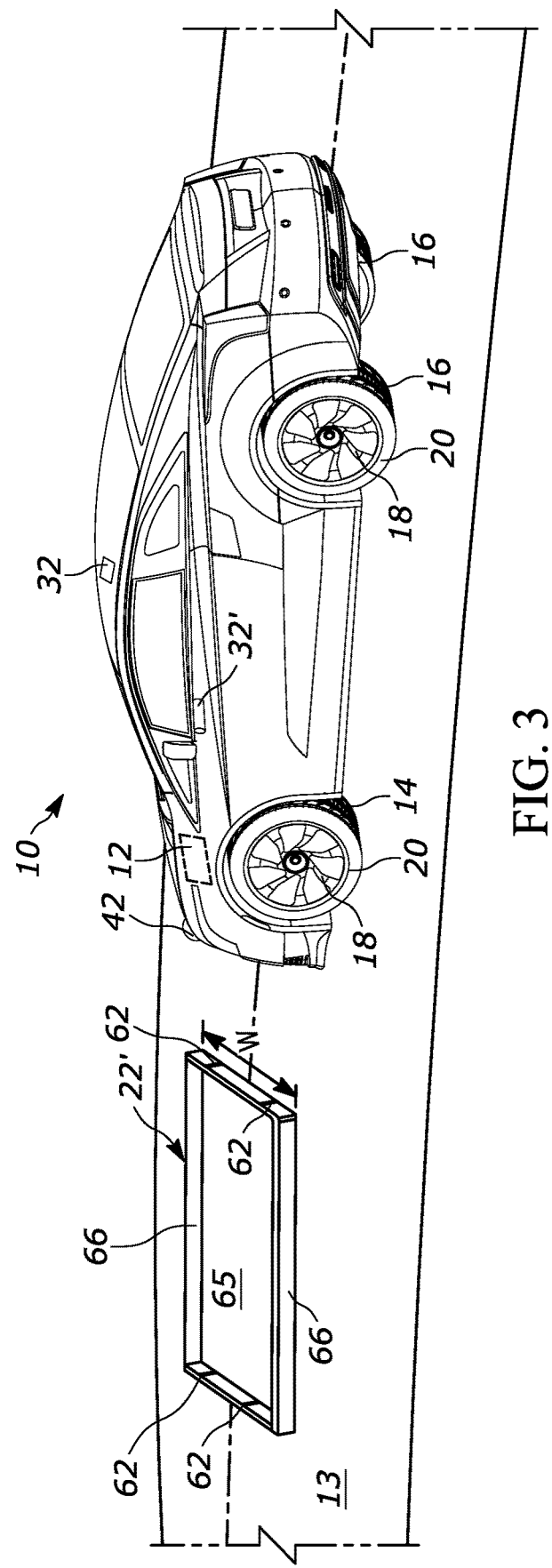
FIG. 3 is a perspective view of an exemplary vehicle having the system of FIG. 2 for guiding a vehicle into position over a fixed frame structure defining a pit in an oil change bay in accordance with an embodiment of the invention.

With reference to FIG. 3, instead of the fixed object being a carwash conveyor structure, the fixed object is generally rectangular frame structure 22' defining bounds of an open pit 65 in a quick oil change bay. A driver, when approaching the oil change bay, can activate an autonomous oil change bay entry mode of the vehicle 10 by using the touch screen display 46, knob or switch 48 or a voice command received by the voice receiver 50. Then, the controller 47, with processor circuit 58 and tracking module 61 executing software stored in the memory circuit 60, is configured to receive sensed data, for example from at least the camera 32' and/or radar/sonar/LIDAR sensor 42 to identify and locate the frame structure 22' on the travel surface 51 in front of the vehicle 10, and to control the steering and braking of vehicle 10 based upon such sensed data. In the example embodiment of FIG. 3, the tracking module 61 identifies and locates the frame structure 22', as the fixed object, based upon the sensed data. The memory circuit 60 can also store standard dimensions of the width W of the frame structure 22' to aid in guiding the vehicle tires 14 so as to be adjacent opposing sides 66 of the frame structure 22'. For increased accuracy, portions of the frame structure 22' can include markers 62 thereon that are captured or sensed by the camera 32' and/or sensor 42. With frame structure 22' identified and located, the controller 47 sends the drive system 30 one or more commands 64 causing the steering system 56 and acceleration system 54 to autonomously maneuver the vehicle 10 in a forwards direction over the frame structure 22' such that front tires 14 of the vehicle 10 are generally aligned with and generally adjacent to the opposing sides 66 of the frame structure 22'. Once the vehicle 10 is aligned over the pit 65, the brake system 52 causes the vehicle 10 to stop. Thus, due to autonomously maneuvering the vehicle 10 over the open pit 65, no attendant is needed and driver misalignment errors are eliminated.

In either of the embodiments of FIGS. 1 and 3, the driver can be seated in the vehicle, without operating the steering, acceleration, or braking, while the controller 47 autonomously drives and stops the vehicle 10 relative to the fixed object 22, 22', or the driver can be outside of the vehicle 10. Thus, the driver activate the autonomous mode and can leave the vehicle 10 in a line of vehicles waiting to enter the carwash or oil change bay. The vehicle 10 would autonomously follow the vehicle in front of it in line. With regard to the carwash mode, once the vehicle is stopped and engaged with the conveyor structure 22, the driver or attendant, or the controller 47 can cause the transmission system 57 to place the vehicle 10 into neutral so the vehicle 10 can move along with the conveyor structure 22. With regard to the oil change mode, once the vehicle 10 is stopped and aligned over the pit 65, the controller 47 causes the transmission system 57 to place the vehicle in park and turns off the ignition. The controller 47, once activated, can also cause the vehicle 10 to autonomously drive out of the oil change bay.

Figure 4:
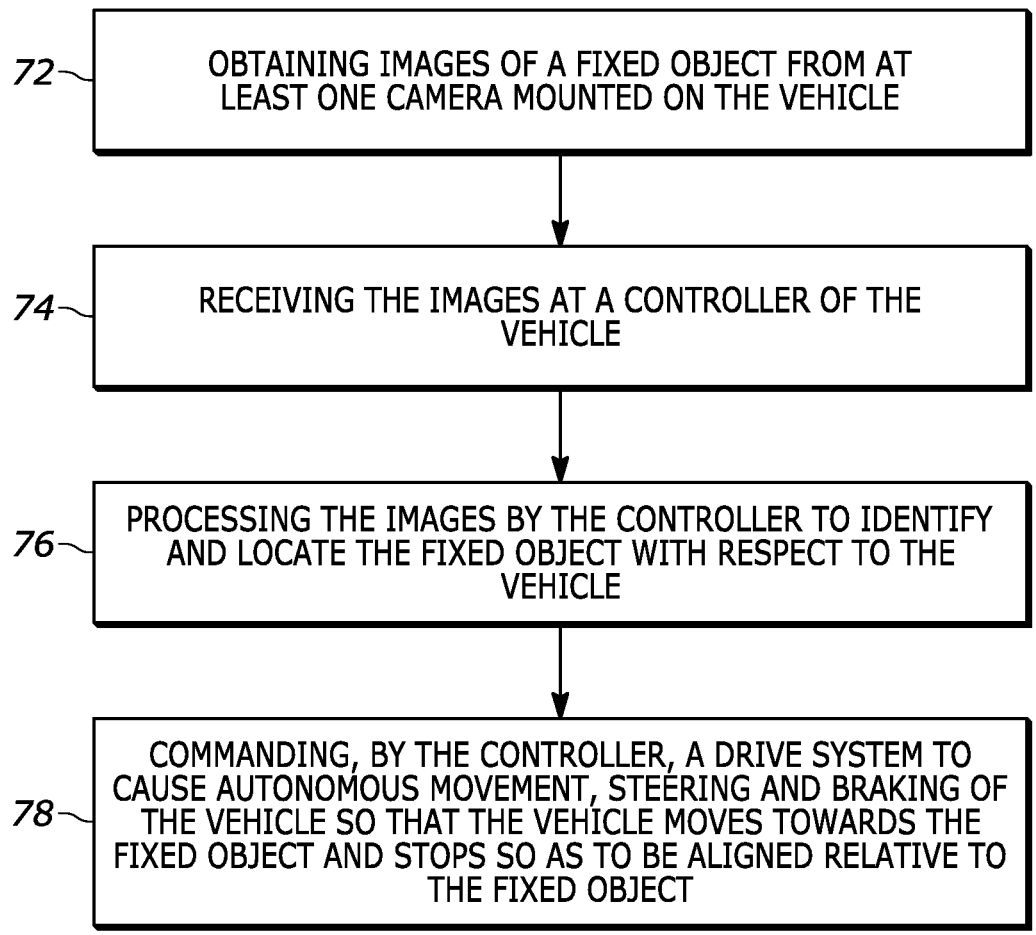
FIG. 4 is a flowchart of method steps of an embodiment.

Thus, with reference to FIG. 4, method steps for obtaining images of the fixed object from at least one camera 32' mounted on the vehicle 10 includes in step 72, obtaining images of the fixed object from at least one camera mounted on the vehicle. In step 74, the images 34 are received at the controller 47 of the vehicle. In step 76, the images 34 are processed by the controller 47 to identify and locate the fixed object (e.g., conveyor structure 22 or frame structure 22') with respect to the vehicle 10. In step 78, the controller 47 commands the drive system 30 to cause autonomous movement, steering and braking of the vehicle 10 so that the vehicle 10 moves towards the fixed object 22, 22' and stops so as to be aligned relative to the fixed object.

Instead of using the vehicle's user interface 44 as a user input device to activate the autonomous modes described herein, the controller 47 can include a receiver of transceiver 68 that receives a wireless signal from an application of a smartphone 70 (as the user input device) so as to activate the appropriate autonomous mode executed by the controller 47.

Thus, unlike known vehicle object avoidance systems that enable the vehicle to avoid objects, the system 12 actually identifies and locates the fixed object and moves the vehicle towards the fixed object so as to be in engagement with the object 22 or to be aligned with or over the fixed object 22'.

Various implementations of the systems and techniques described here (e.g., processor circuit 58, tracking module 61) can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A system for autonomously moving and aligning a vehicle with respect to an object fixed to a traveling surface in front of the vehicle, the system comprising:
   at least one camera mounted on the vehicle, constructed and arranged to obtain images of the fixed object;
   a controller on the vehicle, constructed and arranged to receive the images from the camera and to process the images so as to identify and locate the fixed object with respect to the vehicle;
   a drive system, connected with the controller, constructed and arranged to cause autonomous movement, steering and braking of the vehicle; and
   a user input device constructed and arranged to activate the controller 1) to identify and locate the fixed object relative to the vehicle, and 2) to command the drive system to autonomously move the vehicle towards the fixed object and to stop the vehicle so that the vehicle is aligned relative to the fixed object,
wherein the fixed object is a conveyor structure of an automated carwash, with the drive system being constructed and arranged to autonomously move the vehicle towards the conveyor structure and to stop the vehicle once the vehicle is engaged with the conveyor structure.

2. The system of claim 1, wherein the user input device comprise a user interface disposed in the vehicle and connected with the controller.

3. The system of claim 2, wherein the controller is activated in response to an input on a touch screen display, an input on a knob or switch, or a voice command.

4. The system of claim 1, wherein the controller includes a receiver and the user input device includes a smartphone constructed and arranged to provide a wireless signal to the receiver to activate the controller.

5. The system of claim 1, wherein the controller includes a tracking module and a processor circuit constructed and arranged to receive the images from the at least one camera and determine the location of the fixed image relative to the vehicle.

6. The system of claim 1, further comprising a radar, a sonar or a LIDAR sensor on the vehicle and constructed and arranged to send a signal to the controller for use in locating the fixed object.

7. The system of claim 1, wherein the conveyor structure has markers thereon that are captured by the at least one camera to aid in locating the conveyor structure.

8. The system of claim 1, wherein the drive system includes a transmission system, and wherein the controller is constructed and arranged to place the vehicle in neutral once stopped.

9. A system for autonomously moving and aligning a vehicle with respect to an object fixed to a traveling surface in front of the vehicle, the system comprising:
at least one camera mounted on the vehicle, constructed and arranged to obtain images of the fixed object;
a controller on the vehicle, constructed and arranged to receive the images from the camera and to process the images so as to identify and locate the fixed object with respect to the vehicle;
a drive system, connected with the controller, constructed and arranged to cause autonomous movement, steering and braking of the vehicle; and
a user input device constructed and arranged to activate the controller 1) to identify and locate the fixed object relative to the vehicle, and 2) to command the drive system to autonomously move the vehicle towards the fixed object and to stop the vehicle so that the vehicle is aligned relative to the fixed object,
wherein the fixed object is a frame structure over an open pit of an oil change bay, with the drive system being constructed and arranged to autonomously move the vehicle towards the frame structure and to stop the vehicle once the vehicle is over the open pit.

10. The system of claim 9, wherein the frame structure has markers thereon that are captured by the at least one camera to aid in locating the conveyor structure.

11. The system of claim 9, wherein the drive system includes a transmission system, and wherein the controller is constructed and arranged to cause the transmission system to place the vehicle in park once stopped.

12. A method of autonomously moving and aligning a vehicle with respect to an object fixed to a traveling surface in front of the vehicle, the method comprising the steps of:
obtaining images of the fixed object from at least one camera mounted on the vehicle;
receiving the images at a controller of the vehicle;
processing the images by the controller to identify and locate the fixed object with respect to the vehicle; and
commanding, by the controller, a drive system to cause autonomous movement, steering and braking of the vehicle so that the vehicle moves towards the fixed object and stops so as to be aligned relative to the fixed object
wherein the fixed object is a conveyor structure of an automated carwash, and wherein the commanding step incudes commanding the drive system to autonomously move the vehicle towards the conveyor structure and to stop the vehicle once a tire of the vehicle is engaged with the conveyor structure.

13. The method of claim 12, wherein the method is initiated by providing a user input to a user interface disposed in the vehicle and connected with the controller.

14. The method of claim 12, wherein the method is initiated by sending a wireless signal from a smartphone to a receiver in the controller.

15. The method of claim 12, wherein the controller includes a tracking module to receive the images, the method further comprising:
determining by the tracking module a pixel position along an x-image axis of each image, and a pixel position along a y-image axis of each image.

16. The method of claim 12, wherein the drive system includes a transmission system, and the method further comprises, causing, by the controller, the transmission to place the vehicle into neutral so the vehicle can move along with the conveyor structure.

17. A method of autonomously moving and aligning a vehicle with respect to an object fixed to a traveling surface in front of the vehicle, the method comprising the steps of:
obtaining images of the fixed object from at least one camera mounted on the vehicle;
receiving the images at a controller of the vehicle;
processing the images by the controller to identify and locate the fixed object with respect to the vehicle; and
commanding, by the controller, a drive system to cause autonomous movement, steering and braking of the vehicle so that the vehicle moves towards the fixed object and stops so as to be aligned relative to the fixed object;
wherein the fixed object is a frame structure over an open pit of an oil change bay, and wherein the commanding step incudes commanding the drive system to autonomously move the vehicle towards the frame structure and to stop the vehicle once the vehicle is aligned over the open pit.

18. The method of claim 17, wherein the drive system includes a transmission system, and the method further comprises, causing, by the controller, the transmission to place the vehicle in park once stopped.

* * * * *